(12) United States Patent
Kim et al.

(10) Patent No.: US 9,274,810 B2
(45) Date of Patent: *Mar. 1, 2016

(54) METHOD AND AN APPARATUS TO UPDATE THE SNAPSHOT IMAGE IN A NONVOLATILE MEMORY BASED ON COMPARING A FIRST DATA WITH THE SECOND DATA

(71) Applicant: Samsung Electronics Co., Ltd., Gyeonggi-do (KR)

(72) Inventors: Kyoung Hoon Kim, Seoul (KR); Sung Hwan Yun, Gyeonggi-do (KR); Ho Sun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/447,180

(22) Filed: Jul. 30, 2014

(65) Prior Publication Data

US 2014/0344563 A1 Nov. 20, 2014

Related U.S. Application Data

(63) Continuation of application No. 13/276,718, filed on Oct. 19, 2011, now Pat. No. 8,819,403.

(30) Foreign Application Priority Data

Oct. 19, 2010 (KR) .................. 10-2010-0101848

(51) Int. Cl.
*G06F 9/00* (2006.01)
*G06F 15/177* (2006.01)
*G06F 9/44* (2006.01)

(52) U.S. Cl.
CPC ............ *G06F 9/4418* (2013.01); *G06F 9/4401* (2013.01); *G06F 9/4406* (2013.01); *Y02B 60/186* (2013.01)

(58) Field of Classification Search
CPC .... G06F 9/4401; G06F 9/4406; G06F 9/4418
See application file for complete search history.

(56) References Cited

U.S. PATENT DOCUMENTS

| | | | |
|---|---|---|---|
| 8,082,406 B1 | 12/2011 | Singh et al. | |
| 2004/0157639 A1* | 8/2004 | Morris | H04M 1/24 455/550.1 |
| 2004/0260919 A1* | 12/2004 | Takahashi | 713/2 |
| 2005/0273554 A1 | 12/2005 | Fortin et al. | |
| 2007/0112899 A1* | 5/2007 | Edwards et al. | 707/205 |
| 2008/0177994 A1 | 7/2008 | Mayer | |
| 2010/0037076 A1* | 2/2010 | Reece et al. | 713/324 |
| 2010/0238507 A1 | 9/2010 | Matsushima et al. | |
| 2012/0036346 A1* | 2/2012 | Bower, III | G06F 9/4401 713/2 |

* cited by examiner

*Primary Examiner* — Mohammed Rehman
*Assistant Examiner* — Gayathri Sampath
(74) *Attorney, Agent, or Firm* — The Farrell Law Firm, P.C.

(57) ABSTRACT

A method and an apparatus for supporting a hibernation function in a mobile device are provided. The method includes receiving an input at an electronic device, loading, using one or more processors, a snapshot image for the electronic device in response to the input, comparing at least one portion of the snapshot image with data indicating a state of the electronic device, and updating the snapshot image using the data, based at least in part on a determination that the state of the electronic device has been changed.

18 Claims, 3 Drawing Sheets

METHOD AND AN APPARATUS TO UPDATE THE SNAPSHOT IMAGE IN A NONVOLATILE MEMORY BASED ON COMPARING A FIRST DATA WITH THE SECOND DATA

PRIORITY

This application is a Continuation Application of U.S. patent application Ser. No. 13/276,718, which was filed in the U.S. Patent and Trademark Office on Oct. 19, 2011 and which claims priority under 35 U.S.C. §119(a) to an application filed in the Korean Industrial Intellectual Property Office on Oct. 19, 2010, and assigned Serial No. 10-2010-0101848, the entire disclosure of which is incorporated herein by reference.

BACKGROUND OF THE INVENTION

1. Field of the Invention

The present invention relates generally to a booting technology for a mobile device and, more particularly, to a method and apparatus for supporting a faster and more stable boot process by using a hibernation function in a mobile device.

2. Description of the Related Art

With the remarkable growth of related technologies, many types of mobile devices have recently become popular. Specifically, mobile devices today have outgrown their respective traditional fields and have reached a mobile convergence stage. In the case of a mobile communication device, for example, in addition to traditional communication functions such as a voice call and an Short Message Service (SMS), various essential or optional multimedia functions are widely used such as a portable broadcasting (e.g., Digital Multimedia Broadcasting (DMB) or Digital Video Broadcasting (DVB), a digital music player (such as an e.g., MPEG audio layer-3 (MP3) player), a digital camera, a wireless Internet, a dictionary, and the like.

The use of various functions may cause an increase in the amount of data required to drive a mobile device in a system boot process. This may also increase the time required in a system boot process. Thus, many techniques to reduce the system boot time of a mobile device have been introduced in the art.

One of such techniques is to package data used for a system boot process in a nonvolatile memory (e.g., a flash memory) and then load this package, as it is, into a volatile memory (e.g., Random Access Memory (RAM)) in a system boot process. This data package for a boot process is often referred to as a snapshot image or a hibernation image. Performing a boot process of a mobile device by using a snapshot image is often referred to as a hibernation function.

However, a hibernation function of a conventional mobile device still has drawbacks, including the following drawbacks. If the data volume of a snapshot image is excessively large, a lot of time is required for loading this snapshot image into volatile memory. Thus, this will cause a serious delay of a system boot process in a conventional mobile device.

Additionally, when turned off using a hibernation function, a conventional mobile device performs a process of storing a snapshot image in a nonvolatile memory. Therefore, if a snapshot image is created in abnormal operations of a mobile device, or if abnormal power-off of a mobile device occurs during creation of a snapshot image, this mobile device may fail in a boot process using a snapshot image. Even in case of a successful boot, there is no guarantee that a mobile device will operate in a normal manner.

SUMMARY

Accordingly, the present invention has been made to address the above-mentioned problems and/or disadvantages and to offer at least the advantages described below.

One aspect of the present invention is to provide a method and apparatus for supporting a hibernation function in a mobile device, especially for reducing boot time and power consumption.

Another aspect of the present invention is to provide a mobile device based on a hibernation function and a related operation method, especially for reducing a boot time, securing a memory capacity, and allowing for stable system operation through continued use of a snapshot image and through synchronization of data loaded into a mobile device during a hibernation boot process based on the snapshot image.

Still another aspect of the present invention is to prevent abnormal operations of a snapshot image itself or a crash of a snapshot image by continuously using a snapshot image taken at a particular time, instead of newly creating a snapshot image whenever entering into a hibernation mode, and by synchronizing specific parts only that is different from the former system status in a boot process.

Yet another aspect of the present invention is to optimize environments for a fast operating speed when a mobile device enters hibernation mode and changes to a wakeup state, thus promoting usability, accessibility and competitiveness of a mobile device.

According to an aspect of the present invention, a method is provided including receiving an input at an electronic device, loading, using one or more processors, a snapshot image for the electronic device in response to the input, comparing at least one portion of the snapshot image with data indicating a state of the electronic device, and updating the snapshot image using the data, based at least in part on a determination that the state of the electronic device has been changed.

According to an aspect of the present invention, a method is provided including, receiving an input at an electronic device, comparing, in response to the input, at least one portion of a snapshot image existing in the electronic device with data indicating a state of the electronic device, and generating, using one or more processors, another snapshot image for the electronic device using the data and the snapshot image, based at least in part on a determination that the state of the electronic device has been changed.

According to another aspect of the present invention, an apparatus is provided, including, one or more memories configured to store data indicating a state of the apparatus, one or more processors operatively coupled with the one or more memory, the one or more processors configured to receive an input, load, in response to the input, a snapshot image for the apparatus, compare at least one portion of the snapshot image with the data indicating the state of the apparatus, and update the snapshot image using the data, based at least in part on a determination that the state of the apparatus has been changed.

Other aspects, advantages, and salient features of the invention will become apparent to those skilled in the art from the following detailed description, which, taken in conjunction with the annexed drawings, discloses embodiments of the invention.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
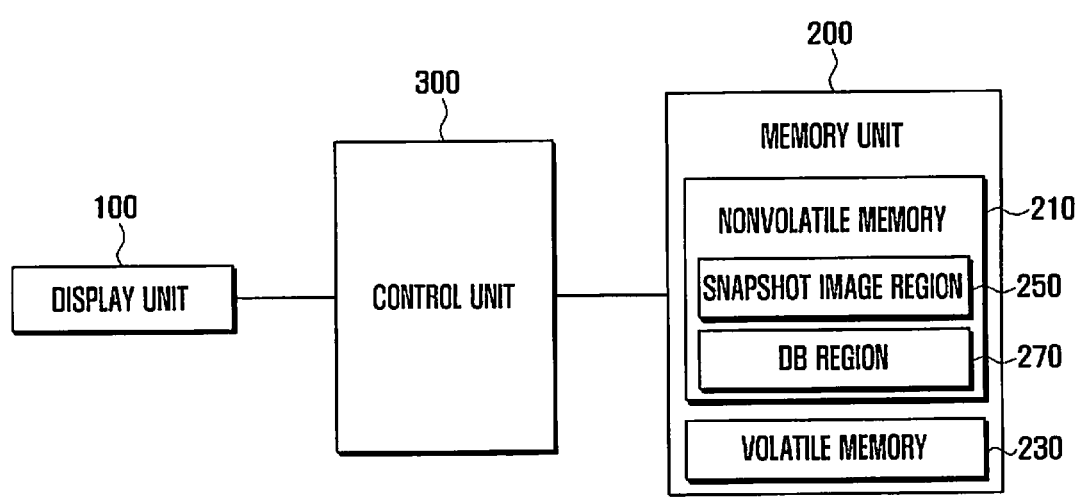
FIG. 1 is a block diagram illustrating a schematic configuration of a mobile device in accordance with an embodiment of the present invention.

Various embodiments of the present invention will now be described more fully with reference to the accompanying drawings. This invention may be embodied in many different forms and should not be construed as limited to the embodiments as set forth in this application. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent illustrative embodiments of the invention, the drawings are not necessarily to scale and certain features may be exaggerated or omitted in order to better illustrate and explain the present invention.

The present invention relates to a mobile device that supports a hibernation function, and also relates to a booting method thereof. Specifically, a mobile device may support a quick boot process by using a predetermined snapshot image when performing a boot process based on a wakeup in a hibernation mode.

According to embodiments of this invention, in order to perform a boot process based on a wakeup, a mobile device omits a snapshot image creation step which is typically required whenever the mobile device enters hibernation mode, and, instead, uses a predetermined snapshot image which is taken at the time of manufacture or created in advance through a setting of a user. Additionally, during a boot process using a snapshot image, a mobile device compares a system status based on a snapshot image with the former system status and then reloads only parts of inconsistency.

In embodiments of this invention, a hibernation function, which is a power management technique of a mobile device, is a function that allows a device to completely stop the supply of power to system components of such mobile device. For instance, when no activity is detected from an input unit (such as a touch screen or the like) for a given time, or when a battery is low, a mobile device enters into a hibernation mode by interrupting a currently executed task.

According to embodiments of this invention, a mobile device allows for a quick entrance into a hibernation mode by omitting a snapshot image creation step, which is typically required whenever a mobile device enters hibernation mode. This minimizes power consumption, and also prevents unexpected errors caused by system instability during the creation of a snapshot image subsequent to entrance into a hibernation mode.

Additionally, in embodiments of this invention, a system recovery in a hibernation mode is referred to as a wakeup in which a system returns to an original state in a hibernation mode and then a task is resumed. This wakeup is different from a typical Power On Reset (POR) ( ) that resets the state of a mobile device.

Furthermore, according to embodiments of this invention, at the time of a wakeup using a snapshot image, a mobile device compares a system status based on a snapshot image with another system status registered in a nonvolatile memory such as Read-Only Memory (ROM) or flash memory, and then performs synchronization for modified parts. Therefore, even though a wakeup is carried out based on a predetermined snapshot image, it is possible to offer data consistent with the former system status (e.g., change of background screens, change of ringtones, modification of phonebook, and the like) before entering hibernation mode. Therefore, this prevents a system boot delay caused by a lot of time required for loading a snapshot image with a big volume into a volatile memory.

In embodiments of this invention, a snapshot image is defined in order to resume a task by a wakeup, namely to recover to a system status of the time when a task is interrupted. This snapshot image may be first established at the time of manufacture of a mobile device or may be established according to a setting of a user. Therefore, this invention avoids the typical process of preserving a system status as a snapshot image whenever entering into a hibernation mode. Here, a system status indicates information (e.g., applications and related data) stored in a volatile memory (e.g., RAM) such as a main memory, and information about system components such as a control unit.

A mobile device recovers a system status by restoring the preserved data to an original location at the time of a wakeup. Such data preserved for a recovery of a system status is referred to as a snapshot image or a hibernation image. In this invention, a snapshot image is not created when a mobile device enters hibernation mode, but created and registered at the time of manufacture of a mobile device or according to a setting of a user.

In this disclosure, a snapshot image refers to specific data used for a system boot process based on a wakeup in a hibernation mode, packaged in a nonvolatile memory (e.g., ROM), and loaded, as it is, into a volatile memory (e.g., RAM) in a system boot process.

A mobile device according to an embodiment of this invention and its operation control method will be fully described with reference to the drawings. The following embodiment is, however, merely illustrative and should not be considered as a limitation of this invention. As will be understood by those skilled in the art, many other alternative embodiments may be used.

FIG. 1 is a block diagram illustrating a schematic configuration of a mobile device in accordance with an embodiment of the present invention.

Referring to FIG. 1, the mobile device includes a display unit 100, a memory unit 200 and a control unit 300. Moreover, the mobile device may include a radio frequency unit for performing a communication function, an audio processing unit having a microphone and a speaker, a digital broadcast module for receiving and playing digital broadcasting such as Digital Multimedia Broadcasting (DMB) or Digital Video Broadcasting (DVB), a camera module for taking a photo or recording a video, a Bluetooth® communication module for performing a Bluetooth® communication function, an Internet communication module for performing an Internet communication function, a touch pad for a touch-based input, a key input unit for a mechanical key input, and the like. Since these elements are well known in the art, related illustration and description will be omitted.

The display unit 100 offers various execution screens of applications supported in the mobile device, including a home screen of the mobile device. Many execution screens associated with essential or optional functions may be provided, for example, such as Short Message Service (SMS), e-mail, Internet, multimedia, search, communication, e-book, video play, camera, image viewer, TV (e.g., DMB or DVB), music playing (e.g., MP3), widget, memo, game, and the like. The display unit 100 may be implemented as a Liquid Crystal Display (LCD) or any other equivalent such as Organic Light Emitting Diodes (OLED) or Active Matrix OLED (AMOLED).

The memory unit 200 stores a variety of programs and related data that are executed and processed in the mobile device, and may include at least one nonvolatile memory 210 and volatile memory 230. The nonvolatile memory 210 may be implemented as ROM, flash memory, or the like, and the volatile memory 230 may be implemented as RAM, or the like. The memory unit 200 may store continuously or temporarily, in the nonvolatile memory 210 or the volatile memory 230, the operating system of the mobile device, programs and data related to a display control of the display unit 100, programs and data related to an input control through the display unit 100, programs and data related to entering hibernation mode of the mobile device, programs and data related to a waking up from hibernation mode, and the like.

In one embodiment, the memory unit 200 stores a snapshot image, which is predetermined at a specific time. For instance, a snapshot image may be a boot data package composed of system components driven when the home screen is displayed at the time of manufacture of the mobile device, or may be packaged in advance according to a setting of a user. Considering that no power is supplied to all system components of the mobile device in a hibernation mode, it is desirable that a snapshot image is stored in the nonvolatile memory 210. Therefore, the nonvolatile memory 210 may have a dedicated region (e.g., a snapshot image region 250) for storing a snapshot image.

Specifically, according to embodiments of this invention, a snapshot image is stored in a particular region (e.g., the snapshot image region 250) allocated in the nonvolatile memory 210. The snapshot image region 250 is present at a physically fixed location in the nonvolatile memory 210. A snapshot image may be created as the default at the time of manufacture of the mobile device or according to a setting of a user. This snapshot image may be preserved in the snapshot image region 250 of the nonvolatile memory 210 until a user requests a change, and used every time whenever the mobile device performs out a wakeup.

Therefore, this invention makes it possible to maintain a valid snapshot image. Namely, a snapshot image of this invention is different from a conventional snapshot image that is repeatedly created in response to an entrance into a hibernation mode. Therefore, this invention does not require a typical process of determining the validity of a snapshot image at the time of a wakeup. Also, this invention prevents conventional errors caused by an abnormal loss of power.

Additionally, at the time of a wakeup based on a snapshot image, this invention offers data consistent with the former system status (e.g., change of background screens, change of ringtones, modification of phonebook, etc.) before an entrance into a hibernation mode. For instance, such a system status of the mobile device is registered in a particular region (e.g., a database region 270) of the nonvolatile memory 210. Therefore, this invention performs synchronization by comparing a system status (e.g., currently executed data) loaded by a snapshot image at the time of a wakeup with the former system status (e.g., data stored in the database region 270) before an entrance into a hibernation mode.

In embodiments of this invention, system status synchronization is performed as follows.

One case is application synchronization. In this case, each application of the mobile device has a separate database, and a database loaded into the volatile memory 230 at the time of a wakeup by a snapshot image is often different from database stored in the nonvolatile memory 210 (especially, the database region 270). The mobile device compares these pieces of database and finds a change in database. If there is any change in database, the mobile device reloads database of the database region 270 into the volatile memory 230.

Another case is data cache synchronization. In this case, consistency may be lost on the level of a file system at the time of a wakeup by a snapshot image. In order to solve the inconsistency, the mobile device clears data cache at the time of a wakeup and then, referring to the database region 270 of the nonvolatile memory 210, loads new data cache. This case may need some time for loading. An advanced technique is to monitor inodes, which indicate a kind of data structure and has information about a file system such as regular files and directories, in which a writing operation occurs in comparison with database of a system status based on a snapshot image, and to store monitoring results in a particular region of the nonvolatile memory 210. The mobile device then selectively loads necessary inodes at the time of a wakeup in a hibernation mode.

Referring again to FIG. 1, the control unit 300 controls the whole operations of the mobile device. Particularly, the control unit 300 controls operations related to a hibernation function. For instance, the control unit 300 controls entrance into a hibernation mode, a boot management subsequent to a wakeup in a hibernation mode, or the like. At the time of a wakeup in a hibernation mode, the control unit 300 temporarily copies a snapshot image from the nonvolatile memory 210 to the volatile memory 230 and thereby controls a return to an initial system status. After a return to a system status using a snapshot image copied to the volatile memory 230, the control unit 300 compares the former system status (e.g., data of the system status before an entrance into the hibernation mode (DB of the nonvolatile memory 210)) with returned system status (e.g., a data of the system status based on the snapshot image (DB of the volatile memory 230)) and thereby control synchronization.

Moreover, the control unit 300 controls at least one of a first update that uses a new snapshot image taken through a user interface and a second update that is made by creating a new snapshot image based on a current system status in response to an input from a shortcut button and replacing the snapshot image with the new snapshot image.

The above-discussed control operations of the control unit 300 will be described again below. The control unit 300 performs a variety of control operations in connection with normal functions. For instance, the control unit 300 controls the execution of applications and a related data display. Further, the control unit 300 receives input signals, in various input forms, from a touch-based input interface and control corresponding functions. And also, the control unit 300 controls a power on/off process in a normal mode.

The mobile device shown in FIG. 1 may be applied to any types of mobile device including a bar type, a folder type, a slide type, a swing type, a flip type, and the like. Additionally, the mobile device of this invention may include any of communication devices, multimedia players and their application equipment. For example, the mobile device may include various mobile communication terminals based on various communication protocols, a tablet Personal Computer (PC), a smart phone, a Portable Multimedia Player (PMP), a digital broadcasting player, a Personal Digital Assistant PDA , a music player (e.g., an MP3 player), a portable game console, and the like.

Figure 2:
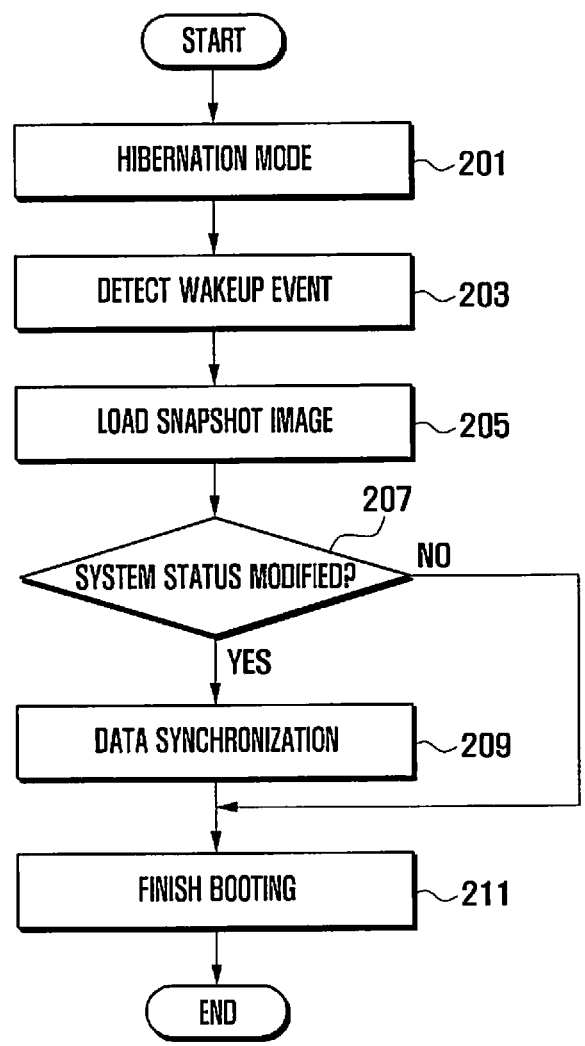
FIG. 2 is a flowchart illustrating a method for supporting a hibernation function in a mobile device in accordance with an embodiment of the present invention.

FIG. 2 is a flowchart illustrating a method for supporting a hibernation function in a mobile device in accordance with an embodiment of the present invention.

Referring to FIG. 2, the control unit 300 enters a hibernation mode in step 201 and then detects a wakeup event in step 203. For instance, if an interrupt of a user occurs through an input unit or power button of the mobile device in the hibernation mode, power is supplied again to the entire system of the mobile device and thereby the control unit 300 detects the wakeup event subsequent to power supply.

In response to the wakeup event, the control unit 300 may load a snapshot image into the volatile memory 230 from the snapshot image region 250 of the nonvolatile memory 210 in step 205. Specifically, the memory unit 300 retrieves the snapshot image from the snapshot image region 250 of the nonvolatile memory 210 and allows the snapshot image to reside in the volatile memory 230 in order to prepare a boot process based on a wakeup of the mobile device. For instance, the control unit 300 restores data recorded in the snapshot image to original locations and returns to a state for starting again a system boot process.

After loading the snapshot image, the control unit 300 determines whether there is a modification of a system status in step 207. For example, the control unit 300 compares data restored depending on the snapshot image after the snapshot image is loaded, with data stored in the database region 270 of the nonvolatile memory 210, and thus determines whether there is a difference between such data. Specifically, the control unit 300 compares data of the system status before an entrance into the hibernation mode with data of the system status based on the snapshot image.

If there is no system status modification (namely, the NO branch of step 207), the control unit 300 finishes a system boot in step 211. If there is any system status modification (namely, the YES branch of step 207), the control unit 300 performs data synchronization in step 209. In particular, the control unit 300 determines that the system status is modified, and then synchronizes data loaded into the volatile memory 230 by the snapshot image based on data stored in the database region 270 of the nonvolatile memory 210.

After the synchronization of data loaded into the volatile memory 230, the control unit 300 finishes the system boot, namely a wakeup process in step 211.

Figure 3:
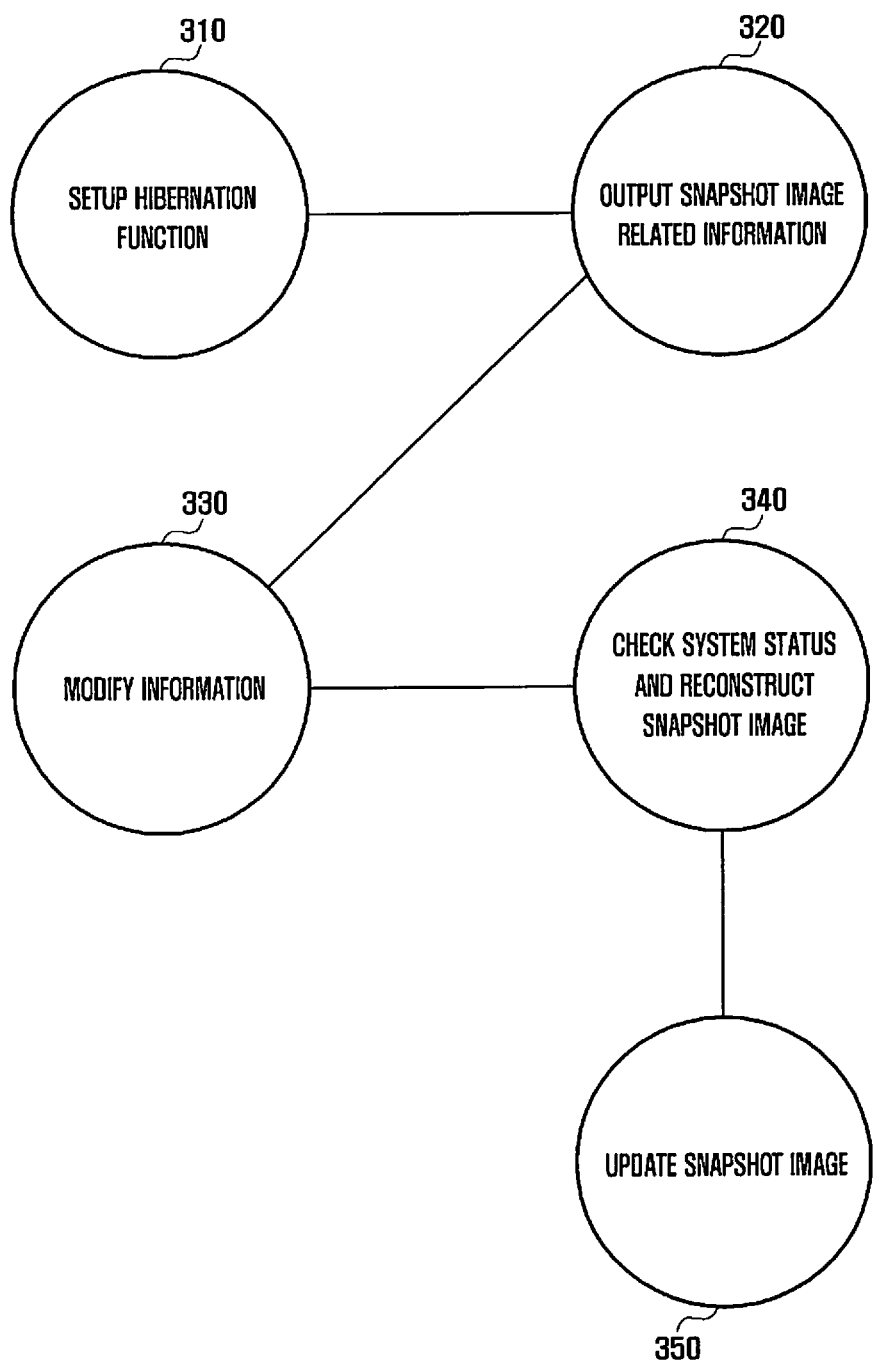
FIG. 3 is a diagram illustrating an update process for a snapshot image in a mobile device in accordance with an embodiment of the present invention.

FIG. 3 is a diagram illustrating an update process for a snapshot image in a mobile device in accordance with an embodiment of the present invention.

FIG. 3 shows a process of modifying a snapshot image according to a setting of a user. First, a user sets the snapshot image differently in connection with a hibernation function, using a user interface provided in the mobile device.

In step 310, when a user interface for setting a hibernation function is invoked , the control unit 300 outputs certain information related to a snapshot image currently established based on the user interface in step 320. Snapshot image related information includes various system status data that constitute the snapshot image. For instance, a system status until the home screen is displayed at the time of manufacture of the mobile device may be offered as a snapshot image.

Next, based on snapshot image related information offered in step 320, a user may modify information such as a snapshot image in step 330. For instance, a user may exclude or add a specific system status from or to related information offered through a user interface. Also, a user may form a snapshot image from a currently running system status in the mobile device. After a modification of information according to a system status based on a setting of a user, a user may enter a command to create a snapshot image.

Next, in step 340, the control unit 300 receives a snapshot image creation command, check a system status resulting from a modification of information, and reconstruct a new snapshot image. Then, in step 350, the control unit 300 updates an existing snapshot image by using the new snapshot image. For instance, the control unit 300 replaces a snapshot image in the snapshot image region 250 of the nonvolatile memory 210 with the new snapshot image.

Although not illustrated in FIG. 3, the creation of a snapshot image may be performed through a shortcut button. For instance, when a user would like to make a snapshot image from a current system status, he or she may select a predefined shortcut button. Then the control unit 300 may newly create a snapshot image based on a current system status.

Additionally, according to embodiments of the present invention, a modified snapshot image is restored to an initial snapshot image. The mobile device may thus remember information related to a system status of the initial snapshot image and perform recovery to the initial snapshot image based on such remembered information.

The above-described methods according to the present invention can be realized in hardware or as software or computer code that can be stored in a recording medium such as a CD-ROM, a Random Access Memory (RAM), a floppy disk, a hard disk, or a magneto-optical disk or downloaded over a network, so that the methods described herein can be rendered in such software using a general purpose computer, or a special processor or in programmable or dedicated hardware, such as an Application-Specific Integrated Circuit (ASIC) or Field-Programmable Gate Array (FPGA). As would be understood in the art, the computer, the processor or the programmable hardware include memory components, e.g., RAM, ROM, Flash, and the like that may store or receive software or computer code that when accessed and executed by the computer, processor or hardware implement the processing methods described herein. Additionally, it would be recognized that when a general purpose computer accesses code for implementing the processing shown herein, the execution of the code transforms the general purpose computer into a special purpose computer for executing the processing shown herein.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. A method comprising:
   storing, at an electronic device including a snapshot image including first data indicating a first state of the electronic device stored in a first specified region of a nonvolatile memory operatively coupled with the electronic device, second data indicating a second state of the electronic device in a second specified region of the nonvolatile memory before the electronic device enters a hibernation mode;
   receiving an input at the electronic device;
   loading, using one or more processors, the snapshot image in response to the input;

comparing the first data with the second data; and updating the snapshot image using the second data, based at least in part on a determination that the second data has been changed compared to the first data.

2. The method of claim 1, wherein the receiving comprises:

detecting the input when the electronic device is in the hibernation mode.

3. The method of claim 1, wherein the input comprises a user input.

4. The method of claim 1, wherein a state of the electronic device comprises configuration related to at least one of an application, a phone book, a system component, a background screen, or a ringtone installed at the electronic device.

5. The method of claim 1, wherein the loading comprises:

retrieving the snapshot image from the nonvolatile memory; and storing the snapshot image retrieved from the nonvolatile memory in a volatile memory at least temporarily.

6. The method of claim 1, further comprising:

refraining from updating the snapshot image based at least in part on a determination that the second data has not been changed compared to the first data.

7. The method of claim 1, further comprising:

booting the electronic device using the snapshot image as updated based on the second data.

8. A method comprising:

receiving an input at an electronic device including a snapshot image including first data indicating a first state of the electronic device stored in a first specified region of a nonvolatile memory operatively coupled with the electronic device, and including second data indicating a second state of the electronic device in a second specified region of the nonvolatile memory before the electronic device enters a hibernation mode;

comparing, in response to the input, the first data with the second data; and generating, using one or more processors, another snapshot image for the electronic device using the second data and the snapshot image, based at least in part on a determination that the second data has been changed compared to the first data.

9. The method of claim 8, wherein the generating comprises:

replacing the snapshot image with the other snapshot image.

10. The method of claim 8, wherein the generating comprises:

storing the other snapshot image in the nonvolatile memory operatively coupled with the electronic device.

11. The method of claim 8, further comprising:

refraining from generating the other snapshot image based at least in part on a determination that the second data has not been changed compared to the first data.

12. An apparatus comprising:

one or more memory including a nonvolatile memory, the nonvolatile memory including a snapshot image including first data indicating a first state of the apparatus stored in a first specified region of a nonvolatile memory operatively coupled with the apparatus, second data indicating a second state of the apparatus in a second specified region of the nonvolatile memory before the apparatus enters a hibernation mode; and one or more processors operatively coupled with the one or more memory, the one or more processors configured to:

receive an input;

load, in response to the input, the snapshot image;

compare the first data with the second data; and update the snapshot image using the second data, based at least in part on a determination that the second data has been changed compared to the first data.

13. The apparatus of claim 12, wherein the one or more processors are further configured to:

detect the input when the apparatus is in a hibernation mode.

14. The apparatus of claim 12, wherein a state of the apparatus comprises configuration related to at least one of an application, a phone book, a system component, a background screen, or a ringtone installed at the apparatus.

15. The apparatus of claim 12, wherein the one or more processors are further configured to:

retrieve the snapshot image from the nonvolatile memory; and store the snapshot image retrieved from the nonvolatile memory in a volatile memory at least temporarily, as part of the loading.

16. The apparatus of claim 12, wherein the one or more processors are further configured to:

refrain from updating the snapshot image based at least in part on a determination that the second state of the apparatus has not been changed compared to the first state.

17. The apparatus of claim 12, wherein the one or more processors are further configured to:

generate another snapshot image of the apparatus using the second data and the snapshot image, as part of the updating.

18. The apparatus of claim 12, wherein the one or more processors are further configured to:

boot the apparatus using the snapshot image as updated based on the second data.

* * * * *